United States Patent [19]

Braeger

[11] Patent Number: 4,748,721
[45] Date of Patent: Jun. 7, 1988

[54] METHOD FOR GAINING SKIN-FREE BELLY FLAPS OF FISH AND APPARATUS FOR PERFORMING SUCH METHOD

[75] Inventor: Horst Braeger, Lübeck, Fed. Rep. of Germany

[73] Assignee: Nordischer Maschinenbau Rud. Baader Gmbh+Co KG, Lübeck, Fed. Rep. of Germany

[21] Appl. No.: 6,069

[22] Filed: Jan. 22, 1987

[30] Foreign Application Priority Data

Jan. 22, 1986 [DE] Fed. Rep. of Germany ....... 3601767

[51] Int. Cl.⁴ ................... A22C 25/16; A22C 25/17
[52] U.S. Cl. .......................................... 17/50; 17/54; 17/57; 17/62
[58] Field of Search .................... 17/56, 57, 62, 54, 50

[56] References Cited

U.S. PATENT DOCUMENTS 4,008,509  2/1977  Braeger et al. .......................... 17/56
4,037,294  7/1977  Cowie et al. ............................. 17/62

FOREIGN PATENT DOCUMENTS 2742096  5/1978  Fed. Rep. of Germany .......... 17/62

Primary Examiner—Willie G. Abercrombie
Attorney, Agent, or Firm—Thomas R. Morrison

[57] ABSTRACT

The invention relates to a method for gaining skin-free-belly flaps of fish and an apparatus for performing such method. In a fish filleting machine which processes the fish being conveyed tail first and comprises a belly and back filleting tool, a rib severing tool designed as a scraping tool, and a severing tool for releasing meat bands on either side of the spinal column in the tail region, a cutting device is arranged between the two first-mentioned tools, and a further severing device is arranged directly behind the rib severing tool. By actuating the latter at the instance of arrival of the belly cavity end, a cutting element thereof, comprising a knife blade, penetrates the fillet meat up to the inside of the skin and, during further advancing of the fish, splits the skin off the meat portions covering the ribs and the lateral vertebral appendages of the skeleton, i.e. off the belly flaps, so that these are obtained skinless after having passed the rib severing tool.

13 Claims, 4 Drawing Sheets

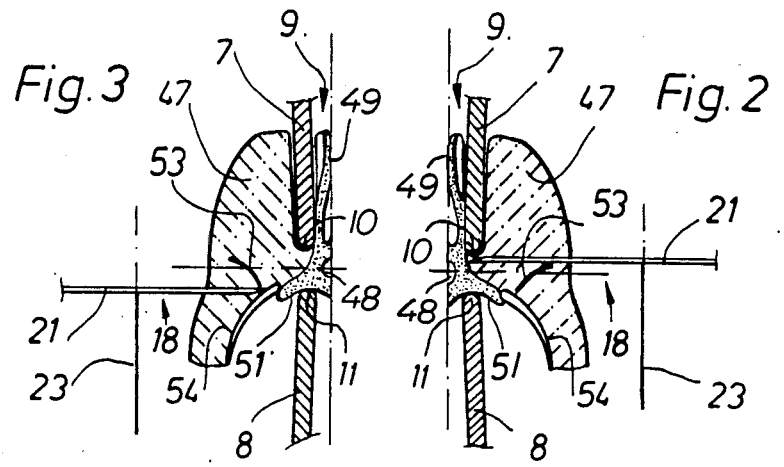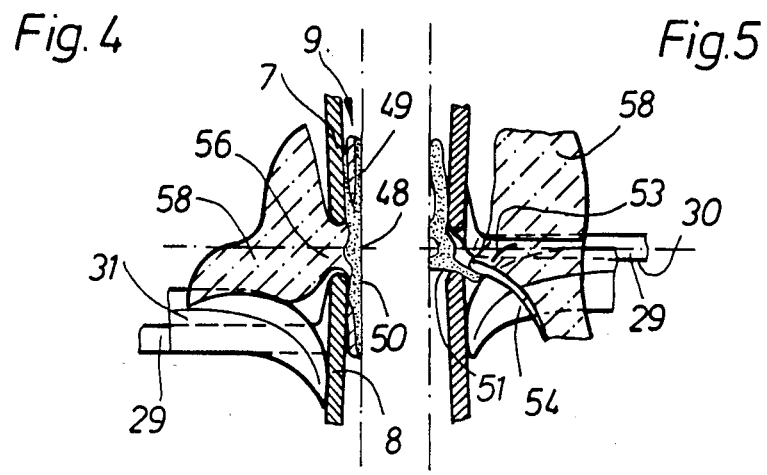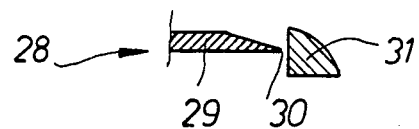

METHOD FOR GAINING SKIN-FREE BELLY FLAPS OF FISH AND APPARATUS FOR PERFORMING SUCH METHOD

BACKGROUND OF THE INVENTION

1. Field of the Invention

The invention relates to a method for separately gaining skin-free belly flaps of fish as well as an apparatus for integration into a fish filleting machine for performing this method, in which each belly flap is severed from the fillets by a longitudinal cut performed substantially in the region of and parallel to the vertebral column as well as perpendicular to the plane of symmetry of the fish, said longitudinal cut extending up to either one of the vertebral appendages and ribs, and by a cross cut following the longitudinal cut and being performed substantially perpendicular to the vertebral column of the fish.

2. Prior Art

The increasing population of the world, on the one hand, and the limited protein resources, on the other, make it a permanent requirement to improve the degree of exploitation of these resources. At the same time, it is very important to optimize the commercial effect by improving the quality of the products concerned.

As far as the exploitation of fish as raw material is concerned, it is known to perform e.g. a separation of the fillets and aim at obtaining vendable products which will gain the possibly highest price, corresponding to their quality, which products are achieved by removing portions which are naturally of lower quality. For this reason, the meat portions of fish, which are situated in the region of the ribs and vertebral appendages surrounding the belly cavity, in other words the belly flaps, are severed by including the pinbones extending into the fillet meat approximately on the level of the lateral portions of the vertebral column. Such severing is performed in order to obtain a "bone-free fillet" which can be offered as a product of highest quality.

German Patent No. 24 60 447 discloses a method and a filleting machine serving this goal. In the course of normal filleting, but before the ribs and the lateral vertebral appendages are cut free by one horizontal cut in the region of the row of pinbones and by one cross cut at the end of the belly cavity, a separation of the belly flap is performed, which may then be cut free by a normal rib cut. The rib-free belly flap obtained separately in this manner is normally used for gaining fish flesh, which, even though it presents a product of highest quality, is considered to be of less value, due to its consistency and structure.

3. Objects of the Invention

It is the basic object of the invention to suggest a possibility of improving the economy of gaining fish protein.

It is a further essential object to offer the aforementioned belly flaps in the shape of pieces which, necessarily, have been skinned and, if possible, are supplied without bones.

It is yet another important object of the invention to perform such processing without additional expenditure on staff.

SUMMARY OF THE INVENTION

In a method for separately gaining skinfree belly flaps of fish, these objects are achieved in that the skinning of the belly flaps is performed during the filleting procedure.

Preferably, the belly flaps are skinned after releasing the fillets from the belly spokes and the lateral vertebral appendages and ribs enclosing the belly cavity, and prior to the final and complete releasing of the fillets from the skeleton.

In a preferred method, in which each belly flap is severed from the fillets by a longitudinal cut performed substantially in the region of and parallel to the vertebral column as well as perpendicular to the plane of symmetry of the fish, said longitudinal cut extending up to either one of the vertebral appendages and ribs, and by a cross cut following the longitudinal cut and being performed substantially perpendicular to the vertebral column of the fish, the above objects are achieved expediently in that the cross cuts following the longitudinal cuts are performed from the inside of the fillets cut free from the belly spokes, the cutting being performed up to the inside of the skin and by splitting the same off in the region of the ribs and of the vertebral appendages.

The advantages obtained thereby particularly reside in that the belly flaps may be separated from the filleting process in their final state and shape at an early stage and can thus be gained separately from the fillets.

The method may be performed in an appropriate manner in a filleting machine defining a conveying path for the fish to be processed and comprising a series of processing tools arranged along said path and on either side thereof and including belly and back filleting tools for releasing the fillets from the belly and back spokes, rib severing tools for releasing the fillets from the lateral vertebral appendages and the ribs, severing tools for completely severing the fillets from the sides or flanks of the vertebral column in the tail region of the fish, and a severing device for the belly flaps, this severing device comprising a cutting device for severing the connection between the respective belly flap and the corresponding back muscle, and a cross cutting device for severing the respective belly flap from the corresponding fillet portions of the tail portion of the fish, a conveyor for conveying the fish along said path and, thus, through the operational zones of the processing tools in a position with its tail end leading and aligned uniformly with respect to the position of its vertebral column, and guiding means including belly and back guides for guiding the cut-free belly and back spokes therebetween and leaving a gap for the passage of at least one of the lateral vertebral appendages and ribs, in which machine the cross cutting device is arranged between the rib severing tools and the severing device and comprises at least one cutting element, each, having a severing edge which is directed substantially against the conveying direction of the fish and extends sideways to the guiding means and transversal thereto, a transfer guide being arranged upstream of said severing edge and covering the latter in its rest position.

A particularly simple and advantageous structure can be obtained in that each cutting element of the cross cutting device includes a knife blade, which is arranged rigidly and whose severing edge extends sideways starting in the vicinity of the back guides and substantially level with the guide edges of the specific back guides facing the gap for the passage of the lateral vertebral appendages and/or the ribs, and that the transfer guide is arranged to be lowered with respect to the severing edge of the knife blade for activating the cutting element.

According to another preferred embodiment of the invention, it is suggested that the transfer guide be arranged rigidly and extend sideways with its guide face substantially level with the guide edges of the back guides and starting in the vicinity thereof, and that the knife blade be arranged to be raised for the purpose of activating the cutting element.

Also, a particularly expedient handling of the apparatus according to the present invention is achieved by way of an embodiment comprising a measuring feeler supplying a measuring signal corresponding to the thickness of the fish being processed, wherein the cutting device and the cross cutting device are provided with control and setting members, whose operations take place whilst taking account of the measuring signal modified by electronic processing and responding to the respective fish thickness. Furthermore, the apparatus according to the present invention may be used rather universally by utilizing the measuring signal by adapting it to the fish species to be processed.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

FIG. 2 shows a one-sided cross-section through the apparatus along section line II—II of FIG. 1, i.e. in the region of the cutting device;

FIG. 3 shows a one-sided cross-section similar to that of FIG. 2 but with a differently arranged circular knife;

FIG. 4 shows a sectional semi-section through the apparatus along section line V—V after the tail portion of the fish has run up on to the rib severing tool, situated in the rest position;

FIG. 5 shows a sectional semi-section through the the apparatus along section line VI—VI after the abdominal cavity end has reached the rib severing tool now in its working position;

FIG. 6 shows a cross-section through one of the rib severing tools designed as scraping tools;

DETAILED DESCRIPTION OF THE PREFERRED EMBODIMENT

Figure 1:
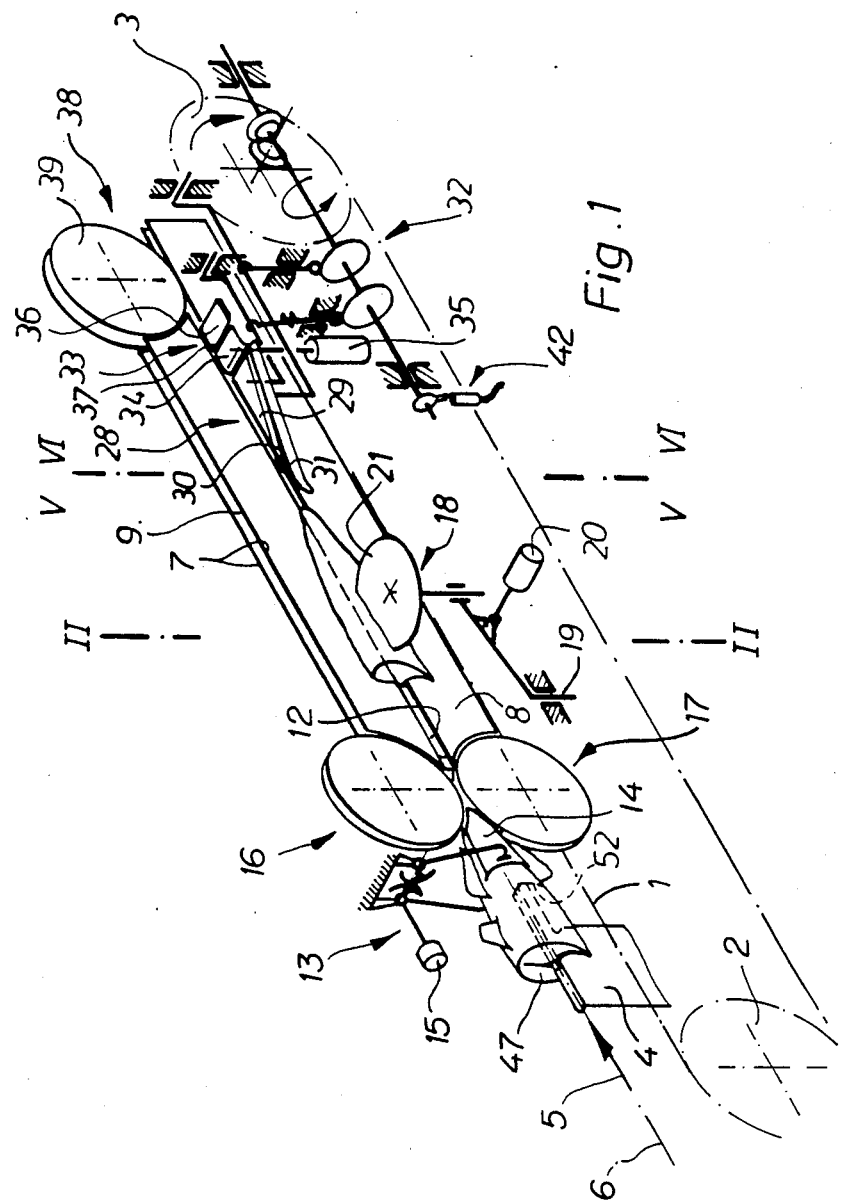
FIG. 1 shows a diagrammatic overall view of an apparatus according to the invention by way of an axonometric representation.
Figure 7:
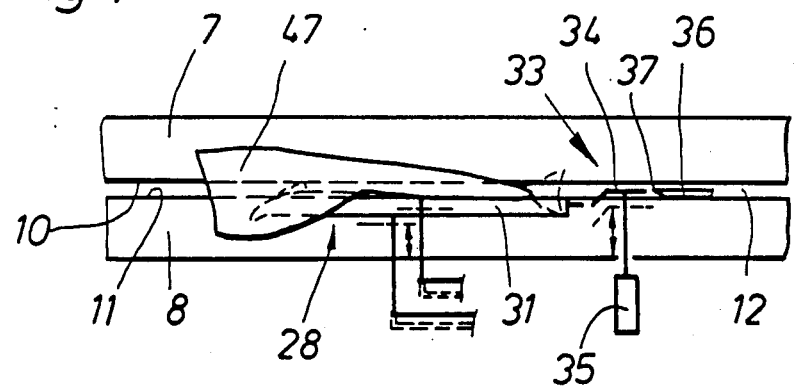
FIG. 7 shows a sectional side view of the apparatus in the region of one of the two scraping tools in operation and the severing tool for severing the belly flaps from the tail portion of the fish in its inoperative position.

An endless conveyor 1 of a fish filleting machine comprises deflection wheels 2, 3, which are mounted in a notshown frame of said machine. The conveyor 1 is equipped with push saddles 4, spaced with respect to one another, and can be driven in an appropriate manner in the direction of arrow 5. The push saddles 4 are advanced by conveyor 1 within a guide path 6, which is formed by two upper guide members, acting as back guides 7, and two lower guide members, acting as belly guides 8. The back guides 7 and belly guides 8 define a vertical guide gap or clearance 9, in which the push saddles 4 are guided, guide edges 10, 11 (FIGS. 2, 3 and 7) of the guides 7, 8 forming a lateral gap or clearance 12 level with the guide path 6. Along the same and symmetrical thereto there is provided successive a series of working tools. When seen in the advancing direction according to arrow 5, the series starts with a measuring feeler 13 provided with oppositely synchronized sensing surfaces 14 and coupled to an angle coder 15. The sensing surfaces 14 are arranged to extend up to the periphery of the circular knives of a subsequent back filleting tool 16 and belly filleting tool 17. The arrangement is such that the first-mentioned tool 16 is positioned above the guide path 6 and the last-mentioned tool 17 below the same. The circular knives, between each other, leave a horizontal gap or clearance level with the guide path 6, which is continued in the gap 12 between the directly following back guides 7 and belly guides 8. This is followed by a cutting device 18 comprising one unit each arranged on either side of the guide gap 9, these units being pivotable relative to the guide gap 9 about a vertical axis 19 by means of a control and setting member 20 and each comprising a circular knife 21 associated with the guide edges 10 of the back guides 7. The cutting device 18 is followed by a rib severing tool 28, which comprises scraping tools arranged on either side of the guide path 6 in a mirror-inverted manner and each constituted by a scraping knife 29 equipped with a diverging cutting edge 30 and a counterpart 31 co-operating with the cutting edge 30. The counterpart 31 and the scraping knife 29 can be moved by means of a cam gear 32 synchronously to the rotation of the conveyor 1 relative to gap 12. The scraping knives 19 are followed by and pass into a cross cutting device 33 comprising, on each side of the path 6, a transfer guide 34, whose guide face extends horizontally and which can be raised and lowered by means of a control and setting member 35. The trailing edge thereof faces a severing or cutting edge 37 of a cutting element shaped as a knife blade 36, the cutting edge 37 being held covered by the transfer guide 34 in the upper position thereof. The tool sequence is ended by a severing tool 38 comprising a pair of parallel circular knives 39, whose cutting edges extend into the plane of the guide edges 11 of the belly guides 8.

Figure 8:
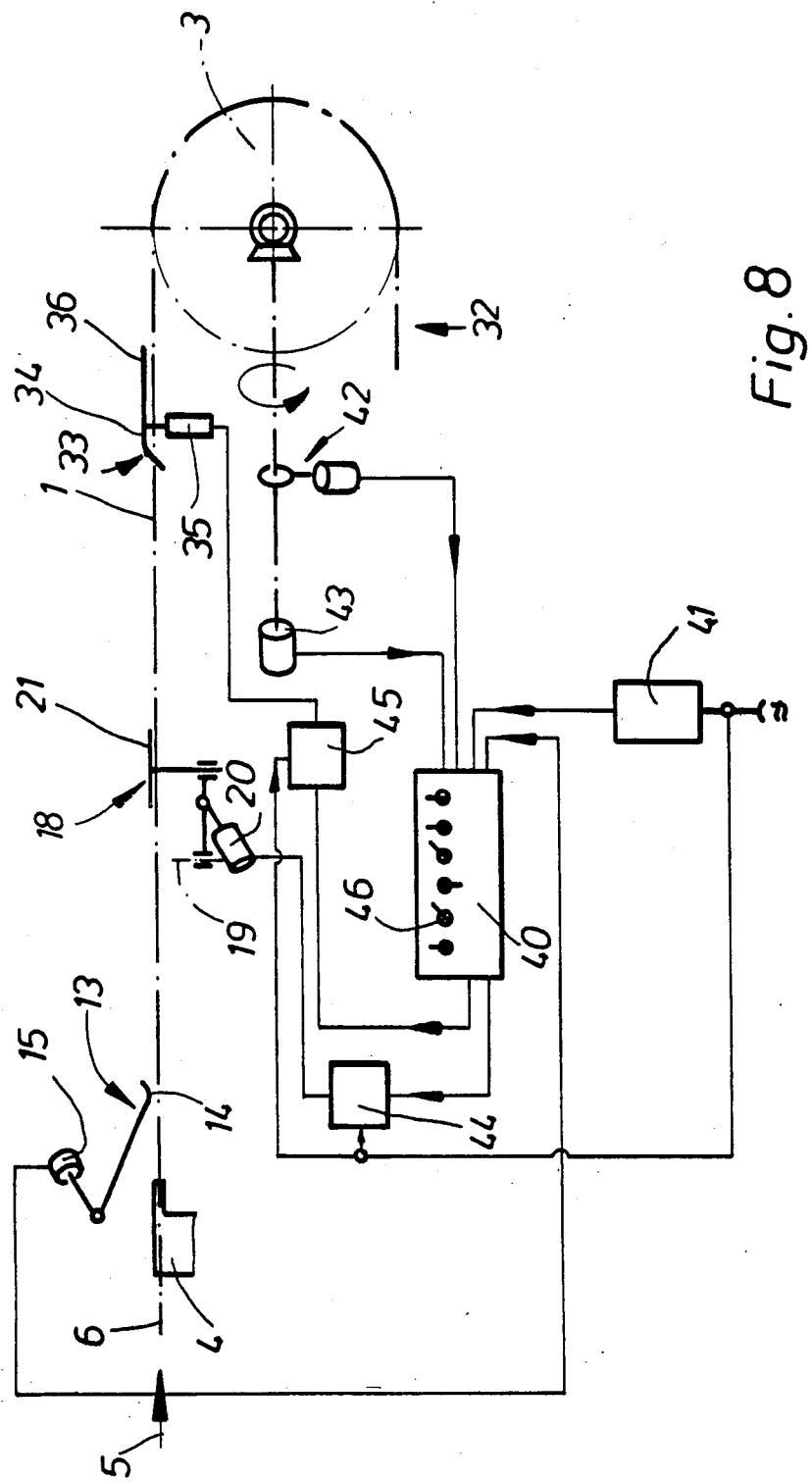
FIG. 8 shows a block diagram of the control system.

According to FIG. 8, the control of the starting times of operation of the cutting device 18 and the cross cutting device 33 takes place by electronically processing the measuring signal supplied by the angle coder 15 and corresponding to the thickness of the fish to be processed. This signal is supplied to a computer unit 40, which is supplied with power by a power supply unit 41. Further signals influencing the function of the computer unit 40 come from a timing generator 42, supplying a pulse for each passage of a push saddle 4 and revolving with the driving shaft of the cam gear 32, and from a speed transmitter 43 installed in a high-speed portion of the drive of the conveyor 1. The output signals are supplied to the control members 20 and 35 by means of intermediately connected power parts 44 and 45, respectively. Selector switches 46 permit a programme pre-selection, with the effect that the times for activating the control members 20 and 35, respectively, can be adapted to the processing of specific, different fish. Such differences can e.g. consist in the row of pinbones 53 (FIGS. 2, 3 and 5), which in the case of saithe (pollachius virens) only extend over one third of the length of the abdominal cavity, so that, in this case, at least the control member 20 is actuated at a later time, whilst also taking account of the measuring signal of the angle coder 15.

Figure 9:
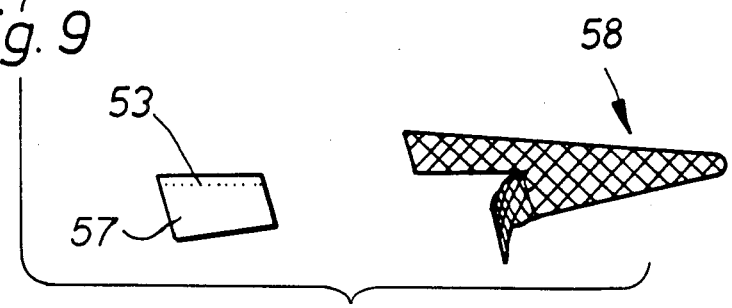
FIG. 9 shows a product obtained with the apparatus using an arrangement of the cutting device according to FIG. 2.
Figure 10:
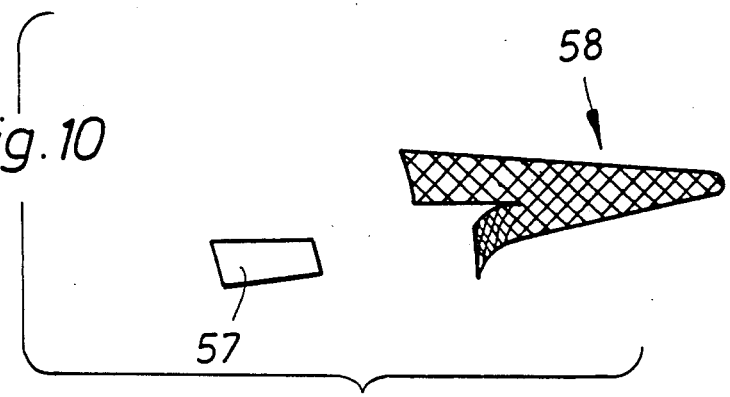
FIG. 10 shows a product obtained with the apparatus using an arrangement of the cutting device according to FIG. 3.

The function of the apparatus is as follows:

A fish 47, which, at least, has had its abdominal cavity opened and been gutted is placed by means of its abdominal cavity on a push saddle 4 advanced by the conveyor 1 in such a way that its tail points in the direction of arrow 5. During conveying, the fish 47 pushes between the sensing surfaces 14 of the measuring feeler 13, the greatest deflection thereof being recorded in the form of a measuring signal by means of the angle coder 15. The sensing surfaces 14, acting as alignment means, guide the fish 47 with its tail fin between the circular knives of the back filleting tool 16 and belly filleting tool 17, said tools starting to cut into the fish 47 on either side of the back spokes 49 (FIGS. 2–4 ) and belly spokes 50 (FIG. 4) up to the vertebral column 48 (FIGS. 2-4) and, in the region of the abdominal cavity, up to the lateral vertebral appendages 51, respectively. During the further advance of the fish 47 the back guides 7 and belly guides 8 penetrate the incisions made and take over the guidance of the fish 47 by receiving between them the meat strips containing the back spokes 49 and the belly spokes 50. The lateral vertebral appendages 51 and ribs 54 (FIGS. 2, 3 and 5) present in the region of the abdominal cavity are guided in the lateral gap 12 between the back guides 7 and belly guides 8. When the abdominal cavity end 52 arrives in the region of the cutting device 18, the latter is pivoted in the direction of guide gap 9 whilst taking account of the measuring signal of feeler 13, so that, depending on the selected position of knife 21, an incision extending parallel to the spine 48 is made above or below (FIGS. 2 and 3, respectively) the row of pinbones 53 and up to the spine 48 and ribs 54, respectively. The fish 47 is then supplied to the rib severing tool 28, which initially remains in a position below the guide edges 11 of the belly guides 8 in order to guide the tail portion of the fish 47 thereabove, whereby the bellyside fillet halves are being laterally spread out in this area, as shown in FIG. 4. When the abdominal cavity end 52, which coincides with the tip of the push saddle 4, arrives the scraping knives 29 are raised with the aid of the cam gear 32 until their tips come into the vicinity of the guide edges 10 of the back guides 7. Simultaneously, the counterparts 31 are moved with their tips into the vicinity of the guide edges 11 of belly guides 8. The scraping knives 29 thus seek their path in the area above the attachment points of the lateral vertebral appendages 51 on the vertebrae of the vertebral column 48, whilst the counterparts 31 come to lie underneath the lateral vertebral appendages 51 and ribs 54 and support these resiliently against the scraping tools 29. The fillet meat cut and scraped free below the vertebral column 48 now passes on to the transfer guides 34 of the cross cutting device 33 and the knife blades 36 thereof. At the instant of arrival of the abdominal cavity end 52 at the cutting edges 37 of knife blades 36, the transfer guides 34 are lowered by means of the control and setting members 35, so that the knife blades 36 penetrate the fillet meat from the inside and produce a cross cut which extends up to the skin. The toughness of the skin prevents an incision into the latter, so that the skin covering the belly flaps 57 remains on the fillet 58 (FIGS. 9 and 10), while the meat parts including the belly flaps 57 are scraped off as conveying continues. This process can be assisted by holding down the fillets by means of appropriate, not-shown holding-down means, and additional conveying means can be used to relieve the fillets 58 during this process. The fillets 58, at this stage still attached in the tail region to the sides of spine 48 via the meat bands 56 (FIG. 4), are cut free thereafter by severing the meat bands 56 by means of the circular knives 39 of the following severing tool 38. Thus, a product as shown in FIG. 9 is obtained, which includes the belly flaps 57 without skin but with the pinbones 53. However, in the case of arranging the circular knife 21 of cutting device 18 in a manner as shown in FIG. 3, the belly flaps 57 will be obtained without pinbones 53 (cf. FIG. 10), either. In both cases, skin-free fillets result.

What is claimed is:

1. A method for producing fillets from fish by a filleting process, said fish having a skeleton structure defining a vertical plane of symmetry, which skeleton structure is enclosed by meat to result, at least partially, in said fillets and by skin covering said meat on the outside thereof and includes a vertebral column extending from a head end towards a tail end; vertebral appendages extending laterally from said vertebral column in the forward head end area thereof and carrying ribs extending downwardly and enclosing a belly cavity; belly spokes extending downwardly from said vertebral column between the end of said belly cavity and said tail end; back spokes extending upwardly from said vertebral column over at least most of its extension; and pinbones extending from said vertebral appendages into said meat above said ribs; said belly cavity being cut open during said filleting process to define belly flaps including said ribs and said meat and skin enclosing said ribs, and skinning said belly flaps during said filleting process before said fillets are fully severed from said skeleton structure.

2. A method as claimed in claim 1, wherein said skinning is performed after releasing said fillets from said belly spokes as well as from said lateral vertebral appendages and said ribs enclosing said belly cavity, and prior to the final and complete releasing of said fillets from said skeleton structure.

3. A method as claimed in claim 1, in which each of said belly flaps is severed from the respective one of said fillets by a longitudinal cut performed substantially in the region of and parallel to said vertebral column as well as perpendicular to said plane of symmetry of the fish, said longitudinal cut extending up to either one of said vertebral appendages and ribs, and by a cross cut following said longitudinal cut and being performed substantially perpendicular to said vertebral column of the fish, wherein, said cross cut following said longitudinal cut is performed from the inside of said fillet cut free from said belly spokes, said cross cutting being performed up to the inside of said skin and by splitting the same off in the region of said ribs and of said vertebral appendages.

4. A method as claimed in claim 2, in which each of said belly flaps is severed from the respective one of said fillets by a longitudinal cut performed substantially in the region of and parallel to said vertebral column as well as perpendicular to said plane of symmetry of the fish, said longitudinal cut extending up to either one of said vertebral appendages and ribs, and by a cross cut following said longitudinal cut and being performed substantially perpendicular to said vertebral column of the fish, wherein, said cross cut following said longitudinal cut is performed from the inside of said fillet cut free from said belly spokes, said cross cutting being performed up to the inside of said skin and by splitting the same off in the region of said ribs and of said vertebral appendages.

5. An apparatus arranged for integration into a fish filleting machine for producing fillets from fish by a filleting process, said fish having a skeleton structure defining a vertical plane of symmetry, which skeleton structure is enclosed by meat to result, at least partially, in said fillets and by skin covering said meat on the outside thereof and includes a vertebral column extending from a head end towards a tail end; vertebral appendages extending laterally from said vertebral column in the forward head end area thereof and carrying ribs extending downwardly and enclosing a belly cavity; belly spokes extending downwardly from said vertebral column between the end of said belly cavity and said tail end; back spokes extending upwardly from said vertebral column over at least most of its extension; and pinbones extending from said vertebral appendages into said meat above said ribs; said belly cavity being cut open during said filleting process to define belly flaps including said ribs and said meat and skin enclosing said ribs, and said apparatus defining a conveying path for said fish to be processed and comprising
 (a) a series of processing tools arranged along said path and on either side thereof and including
  (a1) belly and back filleting tools for releasing said fillets from said belly spokes and said back spokes,
  (a2) rib severing tools for releasing said fillets from said lateral vertebral appendages and said ribs,
  (a3) severing tools for completely severing said fillets from the sides of said vertebral column in said tail end region of the fish, and
  (a4) a severing device for severing said belly flaps, said severing device comprising
   (a41) a cutting device for severing the connection between the respective one of said belly flap and the corresponding meat in the vicinity thereof towards the back of said fish, and
   (a42) a cross cutting device for severing the respective one of said belly flaps from the corresponding neighbouring fillet portions towards said tail end of said fish,
 (b) a conveyor for conveying said fish in a conveying direction along said conveying path and thus through operational zones of said processing tools in a position with said tail end leading and aligned uniformly with respect to the position of said vertebral column, and
 (c) guiding means including belly and back guides each defining guide edges for guiding said cut-free belly and back spokes therebetween and leaving a gap for the passage of at least one of said lateral vertebral appendages and said ribs,
wherein
 (d) said cross cutting device
  (d1) is arranged between said rib severing tools and said severing device and
  (d2) comprises at least one cutting element, said at least one cutting element having a severing edge which is directed substantially against said conveying direction of said fish and extends sideways to said guiding means and transversal thereto, and
 (e) a transfer guide is arranged upstream of said severing edge, has a guide face and covers the latter in a rest position thereof.

6. An apparatus as claimed in claim 5, wherein said at least one cutting element of said cross cutting device includes a knife blade, which is rigidly affixed and has a severing edge extending sideways starting in the vicinity of the back guides and lies substantially level with said guide edges of said back guides facing said gap for the passage of either one of said lateral vertebral appendages and said ribs, and means for lowering said transfer guide with respect to said severing edge of said knife blade for activating said cutting element.

7. An apparatus as claimed in claim 5, wherein said transfer guide is rigidly affixed extending sideways with its guide face substantially level with said guided edges of said back guides and starting in the vicinity thereof, and wherein each cutting element of said cross cutting device includes a knife blade and means for raising said knife blade for activating said cutting element.

8. An apparatus as claimed in claim 5, comprising a measuring feeler supplying a measuring signal corresponding to the thickness of said fish being processed, wherein said cutting device and said cross cutting device are provided with control and setting members responsive to said measuring signal modified by an electronic processing responsive to the respective fish thickness.

9. An apparatus as claimed in claim 6, comprising a measuring feeler supplying a measuring signal corresponding to the thickness of said fish being processed, wherein said cutting device and said cross cutting device are provided with control and setting members responsive to said measuring signal modified by an electronic processor responsive to the respective fish thickness.

10. An apparatus as claimed in claim 7, comprising a measuring feeler supplying a measuring signal corresponding to the thickness of said fish being processed, wherein said cutting device and said cross cutting device are provided with control and setting members responsive to said measuring signal modified by an electronic processor responsive to the respective fish thickness.

11. An apparatus as claimed in claim 8, wherein said electronic processor includes selector switches for converting said measuring signal in accordance with the fish species to be processed.

12. An apparatus as claimed in claim 8, wherein said electronic processor includes selector switches for converting said measuring signal in accordance with the fish species to be processed.

13. An apparatus as claimed in claim 8, wherein said electronic processor includes selector switches for converting said measuring signal in accordance with the fish species to be processed.

* * * * *